(12) United States Patent
Morita et al.

(10) Patent No.: US 9,406,441 B2
(45) Date of Patent: *Aug. 2, 2016

(54) MULTI-LAYER CERAMIC CAPACITOR AND METHOD OF MANUFACTURING THE SAME

(71) Applicant: TAIYO YUDEN CO., LTD., Taito-ku, Tokyo (JP)

(72) Inventors: Koichiro Morita, Takasaki (JP); Youichi Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,126

(22) Filed: Jul. 2, 2015

(65) Prior Publication Data

US 2015/0310989 A1    Oct. 29, 2015

Related U.S. Application Data

(63) Continuation of application No. 14/033,324, filed on Sep. 20, 2013, now Pat. No. 9,105,407.

(30) Foreign Application Priority Data

Sep. 27, 2012   (JP) .................. 2012-214391

(51) Int. Cl.
*H01G 4/12*    (2006.01)
*H01G 4/20*    (2006.01)
*H01G 4/30*    (2006.01)
*H01G 4/012*   (2006.01)

(52) U.S. Cl.
CPC .............. *H01G 4/12* (2013.01); *H01G 4/012* (2013.01); *H01G 4/1227* (2013.01); *H01G 4/20* (2013.01); *H01G 4/30* (2013.01)

(58) Field of Classification Search
CPC ..... H01G 4/1227; H01G 4/30; H01G 4/1209; H01G 4/1218; H01G 4/12; H01G 4/1245; H01G 4/129
See application file for complete search history.

(56) References Cited

U.S. PATENT DOCUMENTS 6,292,354 B1    9/2001   Kobayashi et al.
9,105,407 B2 *  8/2015   Morita .................... H01G 4/12
(Continued)

FOREIGN PATENT DOCUMENTS

JP    2001015374 A    1/2001
JP    2004345927 A    12/2004
(Continued)

OTHER PUBLICATIONS

A Notice of Reasons for Refusal issued by Japanese Patent Office, mailed May 20, 2014, for Japanese counterpart application No. 2012-214391.

*Primary Examiner* — Dion R Ferguson
(74) *Attorney, Agent, or Firm* — Law Office of Katsuhiro Arai

(57) ABSTRACT

A multi-layer ceramic capacitor is constituted by ceramic dielectric layers alternately laminated with conductive layers, wherein the ceramic dielectric layers are sintered in such a way that core-shell grains having a core-shell structure are mixed with uniform solid-solution grains resulting from uniform progression of the solid solution process. Such multi-layer ceramic capacitor is characterized in that the area ratio of the core-shell grains to all sintered grains constituting the ceramic dielectric layer is 5 to 15% and that the average grain size of all sintered grains including the core-shell grains and uniform solid-solution grains is 0.3 to 0.5 μm.

5 Claims, 1 Drawing Sheet

(56) References Cited

U.S. PATENT DOCUMENTS

2004/0105214 A1  6/2004  Nakamura et al.
2010/0195265 A1  8/2010  Nakamura et al.
2011/0222205 A1  9/2011  Muraki et al.

FOREIGN PATENT DOCUMENTS

| | | |
|---|---|---|
| JP | 2006041371 A | 2/2006 |
| JP | 2008297179 A | 12/2008 |
| JP | 2013197492 A | 9/2013 |

* cited by examiner

MULTI-LAYER CERAMIC CAPACITOR AND METHOD OF MANUFACTURING THE SAME

CROSS-REFERENCE TO RELATED APPLICATIONS

This application is a continuation of U.S. patent application Ser. No. 14/033,324, filed Sep. 20, 2013, which claims priority to Japanese Patent Application No. 2012-214391, filed Sep. 27, 2012, each disclosure of which is incorporated herein by reference in its entirety. The applicant(s) herein explicitly rescind(s) and retract(s) any prior disclaimers or disavowals made in any parent, child or related prosecution history with regard to any subject matter supported by the present application.

BACKGROUND

1. Field of the Invention

The present invention relates to a multi-layer ceramic capacitor constituted by ceramic dielectric layers alternately laminated with conductive layers, as well as a method of manufacturing such multi-layer ceramic capacitor.

2. Description of the Related Art

As mobile phones and other digital electronic devices become increasingly smaller and thinner, there is a drive to make the multi-layer ceramic capacitors (MLCCs) surface-mounted on their electronic circuit boards, etc., smaller in size while larger in capacity at the same time. A multi-layer ceramic capacitor has a structure whereby ceramic dielectric layers constituting dielectrics are alternately laminated with conductive layers constituting internal electrodes.

In general, the smaller the size of the capacitor, the smaller the area of the internal electrodes facing the dielectrics becomes and consequently the capacitance decreases. This means that, to make sure a capacitor designed for a smaller chip provides enough capacitance, high-density lamination technology to make the dielectric and internal electrode layers thinner and to laminate many of these layers is essential.

Incidentally, dielectric ceramics whose sintered crystal grains have a core-shell structure have traditionally been known as offering good temperature characteristics. For example, core-shell structured dielectric ceramics whose dielectric constant is subject to less temperature variation can be obtained by adding an auxiliary component containing rare earth elements, etc., to a primary component being barium titanate ($BaTiO_3$) and then sintering the mixed components while suppressing grain growth (refer to Patent Literature 1, for example).

Core-shell structured dielectric ceramics have presented a problem in that, because the auxiliary component of a relatively low dielectric constant turns into solid solution and forms an outer shell around the core, achieving a high dielectric constant is difficult. Also because the core-shell structure is formed while grain growth is suppressed, the dielectric constant is also kept low due to the sizing effect of relatively small grains.

On the other hand, multi-layer ceramic capacitors have been proposed that are formed by mixing grains having a core-shell structure with grains of a uniform grain structure (these grains are referred to as "uniform solid-solution grains" in the present application for patent) to meet the demand for size reduction and capacity increase (refer to Patent Literature 2, for example). Here, a "uniform grain structure" refers to a state where the core-shell structure has been lost in the ceramic-sintering process due to the progression of diffusion of the auxiliary component as solid solution into the core.

With the multi-layer ceramic capacitor in Patent Literature 2, for example, an appropriate sintering temperature and sintering time are selected so that in any section of the dielectric layer, grains having a core-shell structure and uniform grains are mixed at an area ratio in a range of 2:8 to 4:6. This way, a specific dielectric constant of 4500 or more and temperature characteristics meeting the JIS standard D are achieved.

BACKGROUND ART LITERATURES

[Patent Literature 1] Japanese Patent Laid-open No. 2004-345927

[Patent Literature 2] Japanese Patent Laid-open No. 2001-15374

SUMMARY

In recent years, multi-layer ceramic capacitors offering greater capacity (characterized by a dielectric layer thickness of 2 μm or less and specific dielectric constant of 5000 or more, for example) and better temperature characteristics (characterized by meeting the EIA standard X5R, for example) are required for higher-end products.

Any conventional multi-layer ceramic capacitor whose dielectric layer contains a mixture of core-shell grains and uniform grains presents the tendency that the thinner the dielectric layer, the worse the temperature variation characteristics of capacity (TCC: temperature coefficient of capacitance) become. Under the conditions disclosed in Patent Literature 2, for example, the TCC (20° C. to 85° C.) worsens by approx. 5 percentage points when the dielectric layer thickness is reduced from 4.0 μm to 3.0 μm, a level at which the X5R standard is no longer met.

The present invention was developed to solve the aforementioned problem and an object of the present invention is to provide a multi-layer ceramic capacitor offering high dielectric constant and good temperature characteristics even when the thickness of its ceramic dielectric layer is reduced to 2 μm or less, for example, as well as a method of manufacturing such multi-layer ceramic capacitor.

To achieve the aforementioned object, the multi-layer ceramic capacitor proposed by the present invention is a multi-layer ceramic capacitor constituted by ceramic dielectric layers alternately laminated with conductive layers, wherein: each of the ceramic dielectric layers is constituted by sintered grains comprising, consisting essentially of, or consisting of core-shell grains having a core-shell structure and uniform solid-solution grains resulting from uniform progression of the solid solution process; the area ratio of the core-shell grains to all sintered grains constituting the ceramic dielectric layer is 5 to 15%; and the average grain size of all sintered grains including the core-shell grains and uniform solid-solution grains is 0.3 to 0.5 μm.

With the aforementioned multi-layer ceramic capacitor, preferably the post-sintering thickness of the ceramic dielectric layer between the conductive layers is 2.0 μm or less, and more preferably the thickness of the ceramic dielectric layer is 1.2 μm or less.

In addition the method of manufacturing a multi-layer ceramic capacitor proposed by the present invention is a method of manufacturing a multi-layer ceramic capacitor constituted by ceramic dielectric layers alternately laminated with conductive layers and includes: a step to mix a primary component powder of a first grain size constituted by relatively small-sized grains, with a primary component powder of a second grain size constituted by relatively large-sized grains, at a specified blending ratio; a step to add an auxiliary solid-solution component powder to the primary component powders of the first grain size and second grain size, to prepare a dielectric material powder; a step to prepare a green sheet by coating the dielectric material powder; a step to place a conductive paste on the green sheet to form electrode patterns corresponding to two electrodes, one on the left and the other on the right, respectively; a step to laminate the green sheets in such a way that the electrode patterns of the left and right electrodes alternate; and a step to sinter the green sheet laminate in such a way that the area ratio of core-shell grains to all sintered grains constituting the ceramic dielectric layer falls between 5 and 15% and that the average grain size of all sintered grains including the core-shell grains and uniform solid-solution grains falls between 0.3 and 0.5 µm.

With the aforementioned method of manufacturing a multi-layer ceramic capacitor, preferably the grain size ratio of the primary component powder of second grain size to the primary component powder of first grain size is adjusted to 1.1 to 1.2 times and that the specified blending ratio of the primary component powders of first grain size and second grain size (primary component powder of first grain size: primary component powder of second grain size) is in a range of 8:2 to 3:7 based on volume ratio.

According to the present invention, a multi-layer ceramic capacitor can be provided whose dielectric layer has a specific dielectric constant of 5000 or more and which offers stable capacitance temperature characteristics meeting the EIA standard X5R, for example, even when the ceramic dielectric layer thickness is reduced to 2.0 µm or less. As a result, a large capacity and good temperature characteristics can be achieved simultaneously with a smaller multi-layer ceramic capacitor.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

DESCRIPTION OF THE SYMBOLS

1 Multi-layer ceramic capacitor
10 Sintered compact
12 Dielectric layer (ceramic dielectric layer)
13 Internal electrode layer (conductive layer)
15 Cover layer
20 External electrode

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DETAILED DESCRIPTION OF EMBODIMENTS

Figure 1:
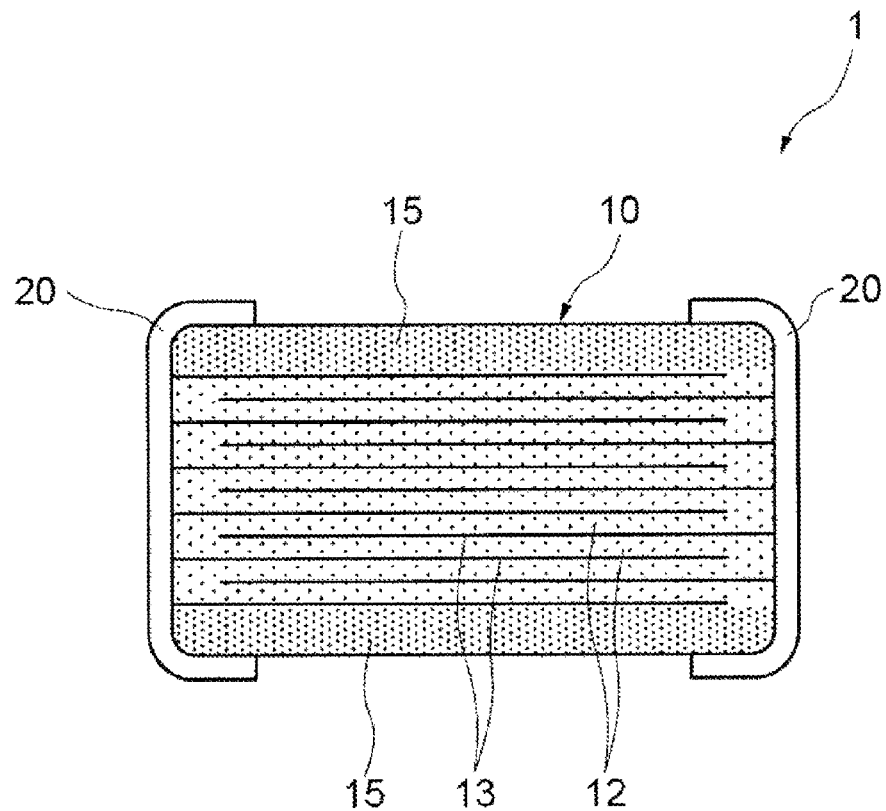
FIG. 1 is a longitudinal section view showing a rough structure of a multi-layer ceramic capacitor.

A multi-layer ceramic capacitor constituted by ceramic dielectric layers alternately laminated with conductive layers is explained below as an embodiment of the present invention. FIG. 1 is a longitudinal section view showing a rough structure of a multi-layer ceramic capacitor 1 in one embodiment of the present invention. The multi-layer ceramic capacitor 1 comprises a sintered compact 10 having a standardized chip size and shape (such as a rectangular solid of 1.0 mm×0.5 mm×0.5 mm in size), and a pair of left and right external electrodes 20, 20 formed on both sides of the sintered compact 10. The sintered compact 10 is formed by alternately laminating many dielectric layers 12 which are ceramic dielectric layers, with many internal electrode layers 13 which are conductive layers constituting the internal electrodes of the capacitor, and cover layers 15 are formed as the outermost layers covering the above. The dielectric layer 12 and cover layer 15 are made of ceramic whose primary component is $BaTiO_3$, for example, while the internal electrode layer 13 is sintered from a primary component which may be a conductive metal containing Ni and/or Ag, for example.

The dielectric layer 12 is sintered from a mixture of core-shell grains having a core-shell structure and uniform solid-solution grains resulting from uniform progression of the solid solution process. Here, the "core-shell structure" refers to the crystal grain structure produced by the sintering process of the sintered compact 10, where the primary component remains at the center (core) of the grain crystal, with the auxiliary component existing as solid solution around the core (shell). The "uniform solid-solution grains" are grains whose crystal grain structure is uniform as a result of progression of diffusion of the auxiliary component as solid solution in the core. In some embodiments, the "core-shell grain" is a crystal grain in which a contour line of the above-defined core can substantially be confirmed when it is observed on a cross section of the dielectric layer, whereas the "uniform solid-solution grain" is a crystal grain other than the core-shell grain.

With the multi-layer ceramic capacitor 1 in this embodiment of the present invention, the area ratio of core-shell grains to all sintered grains is 5 to 15% in any observed cross section of the dielectric layer 12. In addition, preferably the average grain size of the dielectric layer 12, or specifically the average grain size of all sintered grains (or sintered grains randomly selected or all sintered grains observed in a randomly selected area of a cross section of the dielectric layer) including core-shell grains and uniform solid-solution grains, is 0.3 to 0.5 µm. Furthermore, preferably the poset-sintering thickness of the dielectric layer 12 between the internal electrode layers 13 is 2.0 µm or less. More preferably the thickness of the dielectric layer 12 is 1.2 µm or less.

The multi-layer ceramic capacitor 1 has a high-density multi-layer structure comprising anywhere from one hundred to several hundreds of dielectric layers 12 and internal electrode layers 13. The cover layers 15 formed as the outermost layers of the sintered compact 10 are provided to protect the dielectric layers 12 and internal electrode layers 13 from moisture, contaminants and other pollutants present on the outside and thereby prevent deterioration of these layers over time.

The multi-layer ceramic capacitor 1 is manufactured through the steps described below, for example. First, ceramic materials such as $TiO_2$ and $BaO_3$ are weighed and mixed and the mixture is prebaked to prepare a primary component material. Next, the prepared primary component material is crushed into a primary component powder of a first grain size constituted by relatively small-sized grains (referred to as "small-sized grains") and a primary component powder of a second grain size constituted by relatively large-sized grains (referred to as "large-sized grains"). For example, primary component powders having different grain sizes of 0.30 μm and 0.33 μm can be prepared. The grain size of primary component powder can be managed by the average grain size based on grain size distribution (such as the median diameter d50). Preferably the ratio of the grain size of large-sized grains (primary component powder of second grain size) is adjusted to 1.1 to 1.2 times the grain size of small-sized grains (primary component powder of first grain size).

In addition, preferably the tetragonality (c/a ratio) of large-sized grains (primary component powder of second grain size) is higher than that of small-sized grains (primary component powder of first grain size). For example, a primary component material with a c/a ratio of 1.0100 can be crushed to prepare large-sized grains, and a primary component material with a c/a ratio of 1.0094 can be crushed to obtain small-sized grains. While sintering makes a majority of the small-sized grains of the lower c/a ratio uniform, some of the large-sized grains of the higher c/a ratio maintain a core-shell structure as the solid solution process remains in progress. Note that the tetragonality (c/a ratio) of crystal can be measured using the X-ray diffraction method.

Accordingly, the mixing ratio of core-shell grains and uniform solid-solution grains, or residual ratio (area ratio) of core-shell grains, can be controlled within a desired range to some extent by adjusting, as deemed appropriate, the blending ratio of the small-sized grains and large-sized grains in the primary component powders for dielectrics.

Next, small-sized grains (primary component powder of first grain size) and large-sized grains (primary component powder of second grain size) are mixed at a specified blending ratio. Preferably the blending ratio of "Small-sized grains": "Large-sized grains" is in a range of 8:2 to 3:7 based on volume ratio.

A specified quantity of an auxiliary solid-solution component powder is added, as an auxiliary component to constitute the shell, to the primary component powders of small-sized grains and large-sized grains, and wet-mixed to prepare dielectric material powders. The auxiliary component powder added is made up of a metal oxide and/or metal organic complex, where Ho, Dy and other rare earths and/or Mg, Mn, and other elements can be used, as shown in the example.

The wet-mixed dielectric material powders are dried, after which an organic binder is mixed in and the resulting mixture is coated in the shape of a band-like green sheet of 2 μm or less in thickness using the doctor blade method, for example, and dried. Then, a conductive paste is placed on the green sheet to form electrode patterns for internal electrode layer 13 corresponding to the internal electrodes for the two electrodes on the left and right, respectively. The electrode patterns can be formed by screen-printing a conductive paste on the green sheet, for example.

Green sheets, each formed as above, are laminated so that the electrode patterns for the two electrodes on the left and right alternate, and cover sheets to constitute cover layers 15 are pressure-welded at the top and bottom of the laminated green sheets. Thereafter, the laminated green sheets are cut to a laminate of a specified chip size (such as 1.0 mm×0.5 mm), to expose the electrode patterns for internal electrode layer 13 on both end faces of the laminate. Next, a conductive paste with which to form external electrodes 20, 20 is applied on both end faces of each laminate and dried. It is also possible to deposit thick films on both end faces of the laminate, as external electrodes 20, 20, using the sputtering method. A molding of multi-layer ceramic capacitor 1 is obtained through these steps.

The capacitor molding thus obtained is put in a $N_2$ ambience of approx. 350° C. to remove the binder, after which its temperature is raised to 1150° C. to 1250° C., for example, in an ambience of reducing mixture gas containing $N_2$, $H_2$ and $H_2O$ (and having a partial oxygen pressure of approx. $1.0 \times 10^{-11}$ MPa), and this temperature is held for 10 minutes to 2 hours, for example, for sintering. Then, the temperature is lowered to obtain a sintered compact, after which the temperature is raised to 800° C. to 1050° C., for example, in a $N_2$ ambience, and this temperature is held for 30 minutes to 2 hours, for example, for re-oxidation. This way, a multi-layer ceramic capacitor 1 whose dielectric layer 12 has a specified average grain size and is constituted by core-shell grains and uniform solid-solution grains mixed at a specified ratio, can be obtained.

The average grain size of all sintered grains can be controlled within the aforementioned preferable range (0.3 to 0.5 μm) to some extent based on the sintering conditions such as the rate of rise in temperature used in the sintering process. In addition, the area ratio of core-shell grains to all sintered grains can be controlled to the aforementioned preferable range (5 to 15%) by adjusting, as deemed appropriate, the holding time and other conditions used in the sintering process, as well as the blending ratio of the small-sized grains and large-sized grains in the primary component powders, type of the auxiliary component added, composition ratio of each such component, and so on.

In other embodiments pertaining to the method of manufacturing the multi-layer ceramic capacitor 1, the external electrodes and dielectrics may be sintered in separate steps. For example, it is possible to sinter a laminate constituted by laminated dielectric layers and then bake a conductive paste on both ends of the laminate to form external electrodes 20, 20.

EXAMPLE

Next, an example of the multi-layer ceramic capacitor (MLCC) proposed by the present invention is explained. At least 10 MLCCs were prepared under each of the conditions shown in Table 1 (Groups I to VI: Condition Nos. 1 to 28), and evaluated, respectively. The prepared MLCC chips all had a size of 1.0 mm×0.5 mm×0.5 mm (1005 size).

<Preparation of MLCC>

(1) Preparing the Dielectric Material Powders $BaTiO_3$ powder was used as the starting material for primary components from which to sinter the dielectric layer of the MLCC (hereinafter, barium titanate is abbreviated as "BT"). BT was crushed to prepare BT powders of three different grain sizes represented by 0.33 μM, 0.30 μm and 0.25 μm in median diameter d50, respectively. As shown in Table 1, groups representing different grain size combinations for BT powders (Groups I to VI) were set, and for each group the primary component powders were mixed at varying blending ratios of small-sized grains and large-sized grains under each condition.

As auxiliary solid-solution components to be added to BT powders (primary component powders), $Ho_2O_3$, $Dy_2O_3$, $Gd_2O_3$, $MgCO_3$, $MnCO_3$, $V_2O_5$, and oxide glass powder containing Li and B, were used. The additive quantity of each auxiliary component was adjusted to achieve a composition ratio of 0.2 mol for $Ho_2O_3$, 0.2 mol for $Dy_2O_3$, 0.05 mol for $Gd_2O_3$, 0.5 mol for $MgCO_3$, 0.2 mol for $MnCO_3$, 0.1 mol for $V_2O_5$, and 1.0 mol for oxide glass powder containing Li and B, per 100 mol of $BaTiO_3$ being the primary component.

As shown in Table 1, the grain size ratio of large-sized grains to small-sized grains was adjusted to 1.1 times (=0.33/0.30) for the MLCCs in Groups I and IV. For the MLCCs in Groups II and V, the grain size ratio of large-sized grains to small-sized grains was adjusted to 1.2 times (=0.30/0.25). For the MLCCs in Groups III and VI, the grain size ratio of large-sized grains to small-sized grains was adjusted to 1.32 times (=0.33/0.25).

(2) Preparing the MLCC Molding

The dielectric material powders obtained by adding each auxiliary solid-solution component powder to primary BT component powders of different grain sizes were wet-mixed using an organic binder containing polyvinyl acetal resin and organic solvent, and the mixture was coated to two different thicknesses of 1.5 μm and 1.0 μm using the doctor blade method, to produce green sheets. Then, a Ni conductive paste was screen-printed on these green sheets to form electrode patterns corresponding to the internal electrodes for the two electrodes on the left and right.

A total of 101 green sheets were laminated in such a way that the left and right electrode patterns were positioned alternately. In other words, the number of layers n constituting the MLCC was 100. The laminated green sheets were pressed and then cut to a specified chip size (1.0 mm×0.5 mm). Thereafter, a Ni conductive paste was applied on both end faces of the laminate on which the electrode patterns are exposed, to form right and left external electrodes 20, 20.

(3) Sintering the MLCC Molding

The MLCC molding thus obtained was put in a $N_2$ ambience to remove the binder, after which its temperature was raised to 1250° C. in an ambience of reducing mixture gas containing $N_2$, $H_2$ and $H_2O$ (and having a partial oxygen pressure of approx. $1.0 \times 10^{-11}$ MPa). Table 1 shows the conditions for the rate of rise in temperature used in the sintering process. A sintered compact 10 of MLCC was obtained by setting the holding time at 1250° C. to 2 hours. The sintered compact 10 was annealed, and then Ni—Sn plating was applied to the surfaces of the external electrodes 20, 20.

<Evaluation Methods>

(1) Area Ratio of Core-Shell Grains

In the ceramic dielectric layer in which core-shell grains and uniform solid-solution grains were mixed, the ratio of remaining core-shell grains to all sintered grains was measured based on the area ratio in the observed section.

To be specific, a layer section containing intersecting internal electrodes was cut out from the MLCC and thinned to a thickness of 150 nm using the Ar ion milling method to obtain a dielectric layer sample, after which multiple view fields, each having a size of 15 μm×15 μm and containing at least 100 sintered grains as observed through a TEM (transmission electron microscope), were selected on the sample. Thereafter, the ratio of the total sum of areas (cross-section areas) of core-shell grains to the total cross-section area of all sintered grains in the dielectric layer was calculated, by means of imaging analysis, from at least 20 view fields. Here, grains partially present on the outside the TEM view field were considered in the measurement of area.

Figure 2:
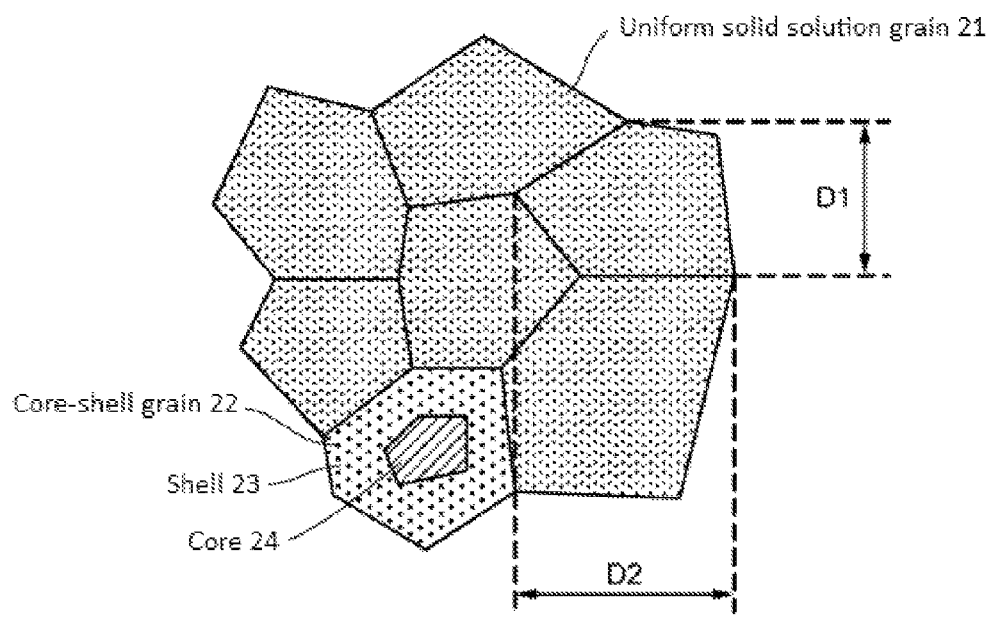
FIG. 2 is a schematic drawing showing an enlarged image of a section of dielectric as observed through a microscope.

FIG. 2 is a schematic drawing showing an enlarged image of a section of dielectric. In imaging analysis, pixels occupying those grains in which a core-shell structure constituted by a core 24 and a shell 23 enclosing the core was observed were selected and the selected pixels were counted, to calculate the area occupied by core-shell grains 22. On the other hand, pixels occupying those uniform solid-solution grains 21 in which no core-shell structure was observed were also selected in the same manner and counted, to calculate the area occupied by uniform solid-solution grains. The sum of areas of core-shell grains and uniform solid-solution grains was adopted as the total area of sintered grains, and the area ratio of core-shell grains to this total area was evaluated as a percentage.

In TEM imaging analysis, pixels not part of any core-shell grain or uniform solid-solution grain were considered pores or voids in the dielectric, or secondary phases constituted by separated impurities, and therefore such pixels were excluded from the calculation of area.

(2) Average Grain Size of Sintered Grains

A side face of the MLCC was polished to expose a layer section containing intersecting internal electrodes, after which the dielectric layers in this section were captured with the TEM and the grain sizes of sintered grains were measured based on the image. On the captured TEM image, at least 20 arbitrary view fields, each having a size of 15 μm×15 μm and containing at least 100 sintered grains as observed, were selected. As shown in FIG. 2, the maximum grain boundary widths D1, D2 in the laminating direction and direction orthogonal to the laminating direction were measured for each sintered grain, and D1 and D2 were added up and the sum was divided by 2 to obtain the grain size D (=(D1+D2)/2) for the grain. The grain size of each sintered grain was measured on the TEM image where at least 20 view fields were present, and the arithmetic mean of measured grain sizes was evaluated as the average grain size of sintered grains.

(3) Specific Dielectric Constant

Formula (1) below was applied to the measured value of capacitance Cm of the MLCC to obtain the specific dielectric constant $\in$. In this example of the present invention, the reference for specific dielectric constant was set as 5000 and samples exhibiting a specific dielectric constant above this level were judged acceptable.

$$Cm = \in \times \in_0 \times n \times S/t \quad (1)$$

Here, $\in_0$ represents the dielectric constant in vacuum, while n, S and t represent the number of dielectric layers, area of the internal electrode layer, and thickness of the dielectric layer, respectively.

The capacitance Cm was measured using an impedance analyzer, with the voltage impression conditions set to 1 kHz and 1.0 Vrms. The number n of the dielectric layers in the MLCCs used in the example was 100. For the area of the internal electrode layer, the effective electrode area estimated from the design values of electrode patterns in the MLCC was used. The thickness of the dielectric layer was obtained from a TEM image of a layer section of the prepared MLCC.

(4) Temperature Characteristics

Temperature characteristics were evaluated based on whether or not the temperature variation characteristics of capacitance (TCC) of the MLCC met the requirement of the EIA standard X5R (the rate of change in capacitance shall be within ±15% in a temperature range of −55 to +85° C.). Table 1 shows the TCC, as a percentage, as calculated from the largest change in capacity $\Delta C$ ($=C_{min} - C_{25° C.}$) in a temperature range of −55 to +85° C. relative to the capacity at 25° C. $C_{25° C.}$ ($=\Delta C/C_{25° C.}$).

<Evaluation Results>

The results of characteristics of the MLCC prepared under the respective conditions are explained by referring to Table 1.

TABLE 1

| Group | Condition No. | A (A1) | A (A2) | A (A3) | B (B1) | C (C1) | C (C2) | C (C3) | D (D1) | D (D2) | D (D3) |
|---|---|---|---|---|---|---|---|---|---|---|---|
| I | *1 | 0.30 | 0.33 | 9:1 | 1500 | 2 | 0.33 | 1.2 | 5900 | −16 | |
|  | 2 | 0.30 | 0.33 | 8:2 | 1500 | 5 | 0.34 | 1.2 | 5900 | −13 | Acceptable |
|  | 3 | 0.30 | 0.33 | 7:3 | 1500 | 10 | 0.34 | 1.2 | 5400 | −11 | Acceptable |
|  | 4 | 0.30 | 0.33 | 6:4 | 1500 | 13 | 0.34 | 1.2 | 5100 | −11 | Acceptable |
|  | 5 | 0.30 | 0.33 | 5:5 | 1500 | 15 | 0.35 | 1.2 | 5000 | −9 | Acceptable |
|  | *6 | 0.30 | 0.33 | 4:6 | 1500 | 17 | 0.35 | 1.2 | 4700 | −9 | |
| II | *7 | 0.25 | 0.30 | 7:3 | 1800 | 5 | 0.29 | 1.2 | 4600 | −14 | |
|  | 8 | 0.25 | 0.30 | 7:3 | 1500 | 5 | 0.30 | 1.2 | 5000 | −15 | Acceptable |
|  | 9 | 0.25 | 0.30 | 7:3 | 900 | 5 | 0.50 | 1.2 | 5100 | −8 | Acceptable |
|  | *10 | 0.25 | 0.30 | 7:3 | 600 | 5 | 0.53 | 1.2 | 4700 | −5 | |
| III | *11 | 0.25 | 0.33 | 3:7 | 2000 | 15 | 0.28 | 1.2 | 4600 | −16 | |
|  | 12 | 0.25 | 0.33 | 3:7 | 1800 | 15 | 0.30 | 1.2 | 5000 | −15 | Acceptable |
|  | 13 | 0.25 | 0.33 | 3:7 | 900 | 15 | 0.50 | 1.2 | 5000 | −8 | Acceptable |
|  | *14 | 0.25 | 0.33 | 3:7 | 600 | 15 | 0.51 | 1.2 | 4700 | −5 | |
| IV | *15 | 0.30 | 0.33 | 9:1 | 1500 | 2 | 0.33 | 0.8 | 6100 | −19 | |
|  | 16 | 0.30 | 0.33 | 8:2 | 1500 | 5 | 0.34 | 0.8 | 6100 | −15 | Acceptable |
|  | 17 | 0.30 | 0.33 | 7:3 | 1500 | 10 | 0.34 | 0.8 | 5500 | −14 | Acceptable |
|  | 18 | 0.30 | 0.33 | 6:4 | 1500 | 13 | 0.34 | 0.8 | 5200 | −12 | Acceptable |
|  | 19 | 0.30 | 0.33 | 5:5 | 1500 | 15 | 0.35 | 0.8 | 5200 | −11 | Acceptable |
|  | *20 | 0.30 | 0.33 | 4:6 | 1500 | 17 | 0.35 | 0.8 | 4800 | −12 | |
| V | *21 | 0.25 | 0.30 | 7:3 | 1800 | 5 | 0.29 | 0.8 | 4900 | −15 | |
|  | 22 | 0.25 | 0.30 | 7:3 | 1500 | 5 | 0.30 | 0.8 | 5100 | −14 | Acceptable |
|  | 23 | 0.25 | 0.30 | 7:3 | 900 | 5 | 0.50 | 0.8 | 5200 | −9 | Acceptable |
|  | *24 | 0.25 | 0.30 | 7:3 | 600 | 5 | 0.53 | 0.8 | 4800 | −6 | |
| VI | *25 | 0.25 | 0.33 | 3:7 | 2000 | 15 | 0.26 | 0.8 | 4600 | −18 | |
|  | 26 | 0.25 | 0.33 | 3:7 | 1800 | 15 | 0.30 | 0.8 | 5300 | −15 | Acceptable |
|  | 27 | 0.25 | 0.33 | 3:7 | 900 | 15 | 0.50 | 0.8 | 5200 | −11 | Acceptable |
|  | *28 | 0.25 | 0.33 | 3:7 | 600 | 15 | 0.51 | 0.8 | 4900 | −8 | |

*indicates an out-of-specification condition (reference example).
A: Primary component of dielectrics (BT powder)
A1: Grain size of small-sized grain [μm]
A2: Grain size of large-sized grain [μm]
A3: Blending ratio of small-sized grains:large-sized grains (volume ratio)
B: Sintering
B1: Rate of rise in temperature [° C./h]
C: Sintered grain structure
C1: Core-shell area ratio [%]
C2: Average grain size of sintered grains [μm]
C3: Thickness of dielectric layer [μm]
D: aracteristics evaluation
D1: Specific dielectric constant [—]
D2: Temperature characteristics TCC [%]
D3: Evaluation For the MLCCs in Groups I and IV (Condition Nos. 1 to 6 and 15 to 20), a BT powder containing small-sized grains of 0.30 μm in grain size and large-sized grains of 0.33 μm in grain size was used, and the ceramic dielectric layer was sintered at each blending ratio under each condition to change the residual ratio of core-shell grains according to each condition. As shown in Table 1, the post-sintering thickness of the dielectric layer was different between Groups I and IV, where, specifically, the thickness of the dielectric layer was 1.2 μm in Group I, but 0.8 μm in Group IV.

Among these MLCCs in Groups I and IV, the MLCCs whose blending ratio of large-sized grains to small-sized grains was low and in which relatively fewer core-shell grains are present (Condition Nos. 1 and 15 corresponding to an area ratio of 2%) had a TCC, which represents the temperature characteristics, worse than −15%. On the contrary, the MLCCs in which more core-shell grains remained (Condition Nos. 6 and 20 corresponding to an area ratio of 17%) had a specific dielectric constant lower than the specified level of 5000.

On the other hand, the MLCCs under Condition Nos. 2 to 5 and 16 to 19 achieved not only a high specific dielectric constant of 5000 or above, but also temperature characteristics corresponding to a TCC within ±15%. The dielectrics of these samples producing good characteristics had an area ratio of core-shell grains of 5 to 15%.

For the MLCCs in Groups II and V (Condition Nos. 7 to 10 and 21 to 24), a BT material powder containing small-sized grains of 0.25 μm in grain size and large-sized grains of 0.30 μm in grain size was used, where the small-sized grains and large-sized grains were blended at a ratio of 7:3. Because a fixed blending ratio of small-sized grains and large-sized grains was used, the post-sintering area ratio of core-shell grains was 5% under all of the conditions.

Using the MLCCs in Groups II and V, the rate of rise in sintering temperature was gradually changed from 1800 to 600° C./h to study how the different sintering conditions would affect the characteristics. As a result, the specific dielectric constant was 5000 or above and a stable TCC of within ±15% was also achieved when the rate of rise in temperature was between 1500 and 900° C./h (Condition Nos. 8, 9, 22 and 23). The average grain size of sintered grains ranged from 0.3 to 0.5 μm under these conditions.

Qualitatively speaking, the lower the rate of rise in temperature, in other words the longer the sintering time, the more the grain growth is promoted. The results of Groups II and V also suggest the tendency that the lower the rate of rise in temperature, in other words the greater the average grain size of sintered grains, the better the temperature characteristics become.

For the MLCCs in Groups III and VI (Condition Nos. 11 to 14 and 25 to 28), a BT material powder containing small-sized grains of 0.25 µm in grain size and large-sized grains of 0.33 µm in grain size was used. Because a fixed blending ratio of small-sized grains and large-sized grains, or 3:5 to be specific, was used, the post-sintering area ratio of core-shell grains became relatively high at 15% under all of the conditions.

Also with the MLCCs in Groups III and VI, the rate of rise in sintering temperature was gradually changed from 2000 to 600° C./h to study how the different sintering conditions would affect the characteristics. As a result, the MLCCs under Condition Nos. 12, 13, 26 and 27 (where the rate of rise in temperature was between 1800 and 900° C./h) achieved a specific dielectric constant of 5000 or above as well as a TCC of within ±15%. In addition, the average grain size of sintered grains ranged from 0.3 to 0.5 µm under the conditions that produced good characteristics based on evaluation.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multi-layer ceramic capacitor constituted by ceramic dielectric layers alternately laminated with conductive layers, wherein:
   each of the ceramic dielectric layers is constituted by sintered grains comprised of core-shell grains each having a core-shell structure wherein a core of primary component is enclosed by a shell of auxiliary solid-solution component, and uniform solid-solution grains each constituted by solid solution without a core;
   an area ratio of the core-shell grains to all the sintered grains constituting each ceramic dielectric layer is 5 to 15% as measured in an observed area of cross section by a transmission electron microscope (TEM) of a randomly selected portion of the ceramic dielectric layer with interposing conductive layers; and
   a grain size representing an average grain size of all the sintered grains including the core-shell grains and uniform solid-solution grains is 0.3 to 0.5 µm.

2. A multi-layer ceramic capacitor according to claim 1, wherein a post-sintering thickness of the ceramic dielectric layer between the conductive layers is 2.0 µm or less.

3. A multi-layer ceramic capacitor according to claim 2, wherein a thickness of the ceramic dielectric layer is 1.2 µm or less.

4. A method of manufacturing a multi-layer ceramic capacitor constituted by ceramic dielectric layers alternately laminated with conductive layers, comprising:
   a step to mix a primary component powder of a first grain size constituted by relatively small-sized grains, with a primary component powder of a second grain size constituted by relatively large-sized grains, at a specified blending ratio;
   a step to add an auxiliary solid-solution component powder to the primary component powders of the first grain size and second grain size, to prepare a dielectric material powder;
   a step to prepare a green sheet by coating the dielectric material powder;
   a step to place a conductive paste on the green sheet to form electrode patterns corresponding to two electrodes, one on the left and the other on the right, respectively;
   a step to laminate the green sheets in such a way that the electrode patterns of the left and right electrodes alternate; and
   a step to sinter the green sheet laminate in such a way that an area ratio of core-shell grains to all sintered grains constituting the ceramic dielectric layer falls between 5 and 15% as measured in an observed area of cross section by a transmission electron microscope (TEM) of a randomly selected portion of the ceramic dielectric layer with interposing conductive layers and that an average grain size of all sintered grains including the core-shell grains and uniform solid-solution grains falls between 0.3 and 0.5 µm.

5. A method of manufacturing a multi-layer ceramic capacitor according to claim 4, wherein a grain size ratio of the primary component powder of the second grain size to the primary component powder of the first grain size is adjusted to 1.1 to 1.2 times and that a specified blending ratio of the primary component powders of first grain size and second grain size (primary component powder of first grain size: primary component powder of second grain size) is in a range of 8:2 to 3:7 based on volume ratio.

* * * * *